United States Patent [19]

Hartman

[11] Patent Number: 5,185,627
[45] Date of Patent: Feb. 9, 1993

[54] ELECTROPHOTOGRAPHIC PRINTER WITH MEDIA MOTION MOTOR CONTROL

[75] Inventor: Richard L. Hartman, Spokane, Wash.

[73] Assignee: Output Technology Corp., Spokane, Wash.

[21] Appl. No.: 770,095

[22] Filed: Oct. 1, 1991

[51] Int. Cl.⁵ .......................................... G03G 21/00
[52] U.S. Cl. ................................... 355/204; 355/208; 355/282; 318/696; 388/907.5
[58] Field of Search ............... 355/200, 204, 208, 282; 318/685, 696; 388/907.5

[56] References Cited

U.S. PATENT DOCUMENTS

| | | | |
|---|---|---|---|
| 3,909,125 | 9/1975 | Reehil et al. | 355/200 |
| 4,926,270 | 5/1990 | Sakamoto | 318/696 X |
| 4,928,141 | 5/1990 | Poehlein et al. | 355/208 |
| 5,107,194 | 4/1992 | Pehlein | 318/696 |
| 5,117,171 | 5/1992 | Bonss | 318/696 |

Primary Examiner—A. T. Grimley
Assistant Examiner—P. J. Stanzione
Attorney, Agent, or Firm—Wells, St. John, Roberts, Gregory & Matkin

[57] ABSTRACT

An electrophotographic printer 10 having a control system 51 for controlling a stepper motor 50. The control system 51 includes a motor speed drive circuit 52, a microprocessor 54, and a clock 58. The motor speed drive circuit 52 has a programmable driver 56 and a logic circuit 60. The microprocessor 54 outputs a speed change value each time a change in the stepper motor is desired. The programmable driver 56 stores the speed change value and incrementally counts down from the speed change value to zero in synchronization with a clock pulse from the clock 58. Upon reaching zero, the programmable divider 56 outputs a speed command signal to the logic circuit 60, which in turn outputs drive signal to control the operation of the stepper motor 50. The microprocessor 54 only outputs a new speed change value when a change in stepper motor operation is desired. If no change is desired, the programmable divider 56 uses the last input speed value to control the stepper motor. As a result, the microprocessor 54 does not constantly interact with the stepper motor 50, and is therefore free to perform other processing tasks.

8 Claims, 2 Drawing Sheets

ELECTROPHOTOGRAPHIC PRINTER WITH MEDIA MOTION MOTOR CONTROL

TECHNICAL FIELD

The present invention relates to electrophotographic printers.

BACKGROUND OF THE INVENTION

Electrophotographic printers are typically constructed with an image fixing station spaced downstream from an image transfer station. Print media, such as paper, is moved through the image transfer station and then through the image fixing station. At the image transfer station, an electophotographic image is transferred to the print media. At the image fixing station, the image is affixed to the print media. The print media is moved through the stations by a roller assembly located at the image fixing station and a guidance system positioned intermediate of the image transfer station and the image fixing station.

A motor is employed to drive the roller assembly and the guidance system. The motor is typically an eletromechanical stepper motor which rotates a precise amount in response to a change in current flow through its windings. The speed of the changes in current flow controls the rate of rotation of the stepper motor, and the order of the changes controls the direction of rotation. The control of the stepper motors is the focus of the present invention.

Prior art electrophotographic printers employ a microprocessor to control the operation of the stepper motors. The microprocessor is directly coupled, or coupled through an amplifying circuit, to the stepper motor. The microprocessor supplies a series of pulses to effectuate the change in current in the stepper motor and thereby change its speed or direction. To drive the stepper motor at a constant speed, the microprocessor must output a constant series of pulses. This demands a substantial amount of processing time and thus, the microprocessor is not able to perform other processing tasks. As the speed of the stepper motor increases, the microprocessor must output the pulses at a higher frequency, thereby consuming even more processing time. Eventually, as the stepper motor speed becomes high enough, the microprocessor becomes entirely dedicated to controlling the stepper motor. As a result, the microprocessor has no time to handle other printer processing tasks.

Direct control of a stepper motor consumes such a significant percentage of the microprocessor's resources that a second microprocessor is often required in the printer engine to handle other processing tasks. For example, the second microprocessor may be used to monitor the paper speed, the fuser temperature in the fuser roller, the laser power output, communicate with the raster image processor, or monitor sensors located throughout the printer (such as a toner low sensor, a media sensor, or a temperature sensor). Since two microprocessors are used in the printer engine, the prior art printers also have separate I/O devices and electronics dedicated solely to the communication between the two microprocessors.

Besides the disadvantage of consuming large amounts of processing time, stepper motors controlled by conventional controllers also suffer unpredictable behavior if the regular microprocessor interaction necessary for normal operation is lost for any reason.

One of the advantages of the present invention is to provide an electrophotographic printer that controls the operation of the stepper motor without constant interaction with the microprocessor, thereby freeing up processing time for other processing tasks. As a result, a single microprocessor may be employed to handle all of the printer engine tasks, including control of the stepper motor. Another advantage of the present invention is that the behavior of the stepper motor in the event of a microprocessor failure is completely predictable.

These and other advantages of the present invention will become apparent upon reading the following detailed description of a preferred embodiment.

BRIEF DESCRIPTION OF THE DRAWINGS

The preferred embodiment of the present invention is described below with reference to the accompanying drawings, which include.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 1:
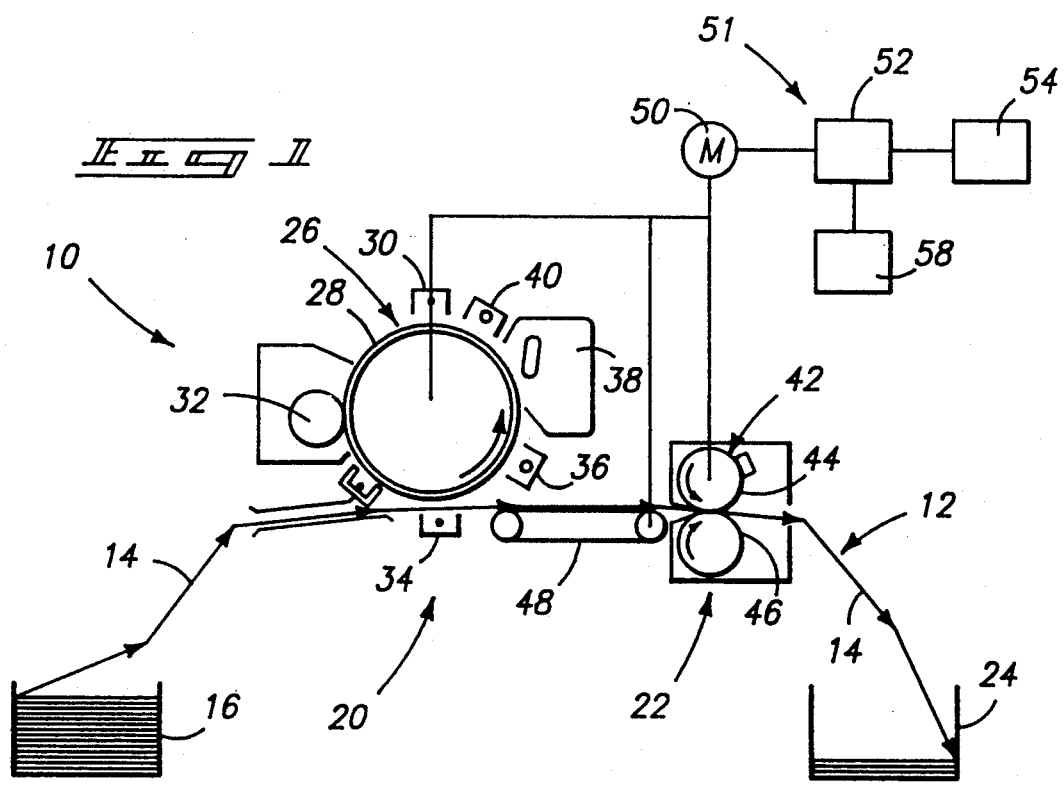
FIG. 1 is a side elevation schematic of a preferred embodiment of a continuous-form electrophotographic printer of the present invention illustrating the continuous-form print media being initially conveyed past an image transfer station and then past an image fixing station to print images onto the continuous-form print media.

FIG. 1 illustrates an electrophotographic printer 10 designed to print on a continuous-form print media 12 composed of individual sheets 14. Preferably, the print media 12 is of the "fan-folded" type having individual sheets that are interconnected at leading and trailing edges. Alternatively, the print media 12 may be a single continuous-form which is later cut into a desired sheet length. Although the printer 10 is described in the preferred embodiment as printing on a continuous-form print media, the invention is not limited to continuous-form printing, but may be employed on printers designed to print single sheets.

The print media 12 is fed from an unprinted storage container 16, through an image transfer station 20 and an image fixing station 22, and deposited into a printed storage container 24.

The electrophotographic printer 10 has an image transfer assembly 26 at the image transfer station 20 for transferring the image from an optical photo conductor (OPC) drum 28 onto the individual sheets 14. The OPC drum 28 includes photoreceptors for producing an electrostatic image on the outer periphery of the drum. The image is generated by an image generator 30, such as a laser or an array of LEDs. The periphery of the drum 28 passes a toner applicator 32 which places a toner or dry ink material on the drum 28 to form a toner image. An image formation device 34 is located at the image transfer station 20 opposite the drum 28 for transferring the toner image from the drum 28 to the individual sheets 14 as the drum 28 is rotated and as the sheets 14 pass through the image transfer station 20.

The image transfer assembly 26 also includes a charge eliminating electrode 36 downstream of the path of the drum 28 for discharging the photoreceptors subsequent to the image transfer. A drum cleaning unit 38 is positioned farther downstream of the movement of the drum 28 to remove any excess remaining toner or dry ink and thereby prepare the drum 28 for a new image. A charging electrode 40 then recharges the photoreceptors of the drum 28.

The electrophotographic printer 10 includes a roller-fuser assembly 42 at the image fixing station 22 which fuses the toner or dry ink powder to the individual sheets 14 to complete the printing process. The roller-fuser assembly 42 includes a fuser roller 44 and a pressure roller 46. The fuser roller 44 is preferably heated to a temperature sufficient to fuse the toner as the sheets 14 pass through the image fixing station 22. The pressure roller 46 presses the sheets 14 firmly against the fuser roller 44 to increase the heat conductivity from the fuser roller 44 to the sheets 14.

The printer 10 also preferably includes a tractor assembly 48 positioned intermediate of the image transfer station 20 and the image fixing station 22, although other guidance systems may also be used. The tractor assembly 48 guides the print media 12 from the image transfer station 20 to the image fixing station 22.

A stepper motor 50 drives the fuser roller 44 and tractor assembly 48. The stepper motor 50 is preferably a two-phase D.C. stepper motor which rotates a precise amount in response to a change in current. The speed of the current change controls the rate of rotation of the stepper motor 50 and the order of the current change controls the direction of rotation.

The stepper motor 50 also drives the drum 28. Preferably, the stepper motor 50 drives the fuser roller 44 and the drum 28 at the same rotational speed, and the tractor assembly 48 at a slightly slower speed to provide appropriate drag on the print media 12. The drag prevents the print media from "bubbling" or "bowing" at the image fixer device 42. In other embodiments, the stepper motor 50 may be employed to drive only the fuser roller 44, or to drive the fuser roller 44 in combination with either the drum 28 or the tractor assembly 48.

A control system 51 is coupled to control the operation of the stepper motor 50. The control system 51 includes a motor speed drive circuit 52 coupled to the stepper motor 50, a microprocessor 54 operatively coupled to, but separate from, the motor speed drive circuit 52, and a clock 58 coupled to the motor speed drive circuit 52. The motor speed drive circuit 52 generates a selected rate of pulses to drive the stepper motor 50 at a desired rotational speed. The motor drive circuit 52 generates the pulses without constant interaction from the microprocessor 54. The microprocessor 54 only interacts with the motor speed drive circuit 54 when necessary to change the selected rate of pulses generated by the motor speed drive circuit 54 and to thereby change the desired rotational speed of the stepper motor 50.

Figure 2:
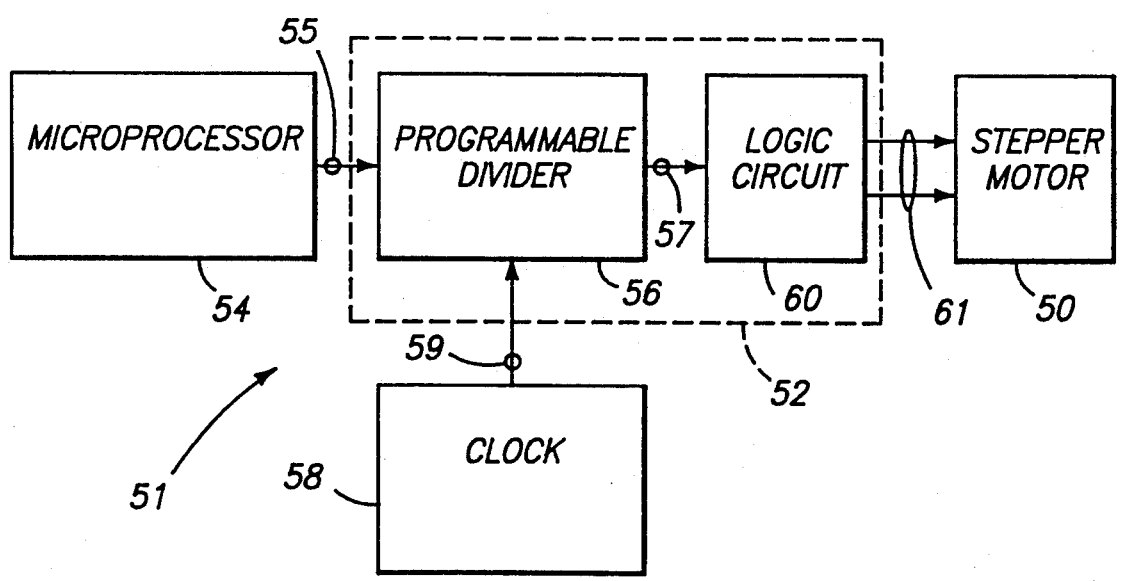
FIG. 2 is a block diagram of a control system for controlling the stepper motor employed in the printer of FIG. 1.

The control system 51 is described in more detail with reference to FIG. 2. The motor speed drive circuit 52 comprises a programmable divider 56 and a logic circuit 60. The microprocessor 54 outputs a speed change value on a conductor 55 to the programmable divider 56, which then stores the speed change value. The clock 58 generates a series of clock pulses and outputs the pulses over a conductor 59. The programmable divider 56 "divides" the clock pulses by the speed change value and outputs a speed command signal over conductor 57 to the logic circuit 60 based upon the result of the division. The "division" procedure is explained below in more detail.

The logic circuit 60 outputs multiple drive signals over conductors 61 to the stepper motor 50 to control the speed and direction of the stepper motor 50. Because a two-phase D.C. stepper motor is employed, the logic circuit 60 outputs two drive signals as illustrated diagrammatically by the two conductors 61 shown in FIG. 2.

Figure 3:
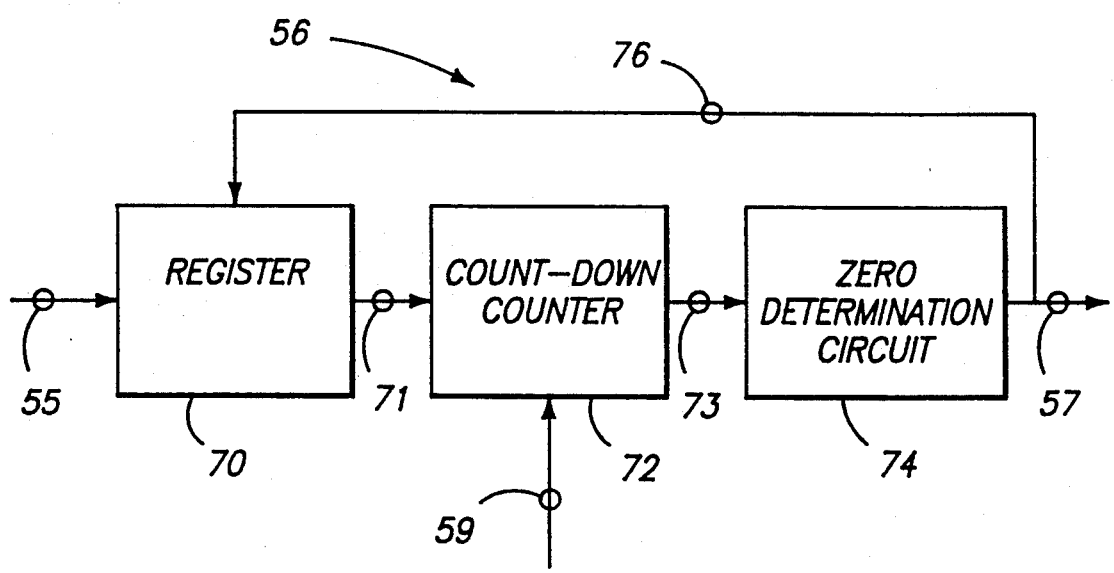
FIG. 3 is a block diagram of a programmable divider employed in the control system shown in FIG. 2.

The programmable divider 56 is described in more detail with reference to FIG. 3. The programmable divider 56 comprises a register 70, a count-down counter 72, and a zero determination circuit 74. The register 70 receives the speed change value from the microprocessor 54 over the conductor 55. The register 70 stores the speed change value until a new speed change value is later received from the microprocessor 54. Upon receipt of the speed command signal via a feedback conductor 76, the register 70 outputs the speed change value over conductor 71 to the count-down counter 72.

Upon receipt of the speed change value, the count-down counter 72 begins incrementally counting down from the speed change value to zero. Each incremental count is synchronized by a clock pulse. The count-down counter 72 outputs a signal indicative of each incremental count over conductor 73 to the zero determination circuit 74, which then determines whether the count has reached zero. When the count reaches zero, the zero determination circuit 74 outputs the speed command signal over the conductor 57 to the logic circuit 60. The speed command signal is also fed back via the feedback conductor 76 to the register 70. As described above, the register 70 then outputs the speed change value stored therein to the count-down counter 72 upon receipt of the speed command signal to begin a new counting cycle. If a new speed change value has not been received from the microprocessor 54, the register 70 outputs the same speed change value stored therein.

To demonstrate the "division" function of the programmable divider 56, suppose the clock 58 outputs 6000 pulses per second. If the speed change value was equal to sixty, the count-down counter 72 would require sixty clock pluses to count down to zero. On the sixtieth clock pulse, the zero determination circuit 74 would sense that the count is zero and output a speed command signal. With a clock input of 6000 pulses per second, the zero determination circuit 74 would output one hundred speed command signals each second. This same result, however, may also be obtained by "dividing" the number of clock pulses per second (i.e., 6000) by the speed change value (i.e., sixty) to yield 100 speed command signals.

On the other hand, suppose the speed change value was one. The count-down counter 72 would only require one count to reduce the speed change value to zero. The zero determination circuit 74 would sense that the count is zero and output a speed command signal every count. As a result, the zero determination circuit 74 would output six thousand speed command signals per second. Again, this result of 6000 speed command signals per second may be obtained by dividing 6000 pulses per second by the speed change value of one. Table 1 lists other speed change values for this example.

TABLE 1

| Clock = 6000 pulses/second | | |
|---|---|---|
| Speed Change Value | Number of Counts to Zero | Speed Command Signals Per Second |
| 60 | 60 | 100 |
| 30 | 30 | 200 |
| 27 | 27 | 222.22 |
| 10 | 10 | 600 |
| 7 | 7 | 857.14 |
| 6 | 6 | 1000 |
| 2 | 2 | 3000 |
| 1 | 1 | 6000 |

As evident from the above examples and table, the programmable divider 56 "divides" the number of clock pulses per second by the speed change value. The nomenclature "programmable divider" is adapted because the programmable divider 56 is effectively "programmed" by the microprocessor 54 when a new speed change value is received. The programmable divider 56 then "divides" the number of clock pulses per second by the speed change value, and outputs the speed command signal based upon the result of this division. As demonstrated by the table, one of the advantages of this design is that the programmable divider 56 can generate non-integer values which may be of significance when controlling minute speed changes in the stepper motor 50.

The above example was provided for explanation purposes. In practice, the clock 58 may output a pulsed signal as high as the megahertz range.

The number of speed command signals output per second controls the speed of rotation of the stepper motor 50. One hundred speed command signals per second results in a slower rotational speed than six thousand speed command signals per second. Therefore, if the stepper motor 50 is to be operated at a slow speed, the microprocessor 54 simply inputs a large speed change value into the programmable divider 56. With a large speed change value, the speed command signals are output less frequently, resulting in a low speed of rotation of the stepper motor 50. If a higher rotational speed is desired, the microprocessor 54 inputs a low speed change value which increases the frequency that the speed command signals are output.

The microprocessor 54 outputs a speed change value only when a change in the speed of the stepper motor 50 is desired. A change in the stepper motor 50 may be desired for a variety of reasons, such as changing the speed of rotation of the stepper motor 50 during the starting and stopping of the media motion system. If no change in operation is desired, however, the program divider 56 will continue to use the last input speed change value stored in register 70. The programmable divider 56 can therefore control the stepper motor 50 without constant interaction with the microprocessor 54. As a result, the microprocessor 54 is able to perform other processing tasks, such as monitoring the paper speed, monitoring and managing the fuser temperature in the fuser roller, monitoring and managing the laser power output, monitoring and managing engine speed, communicating with the raster image processor, and monitoring the various printer sensors (for example, toner low, media sensor, temperature sensor).

As described above, the preferred embodiment of the programmable divider 56 incorporates a count-down counter 72 and a zero determination circuit 74. However, the counter need not count down and the final count value need not be zero. For example, a count-up counter may be employed in conjunction with a circuit which determines whether a high count value (such as 100) has been reached prior to outputting the speed command signal. Further, in an alternative embodiment, the programmable divider 56 may include circuitry which performs a divide function as described above. Counter 72 is preferably employed because of the advantage of design simplicity.

Figure 4:
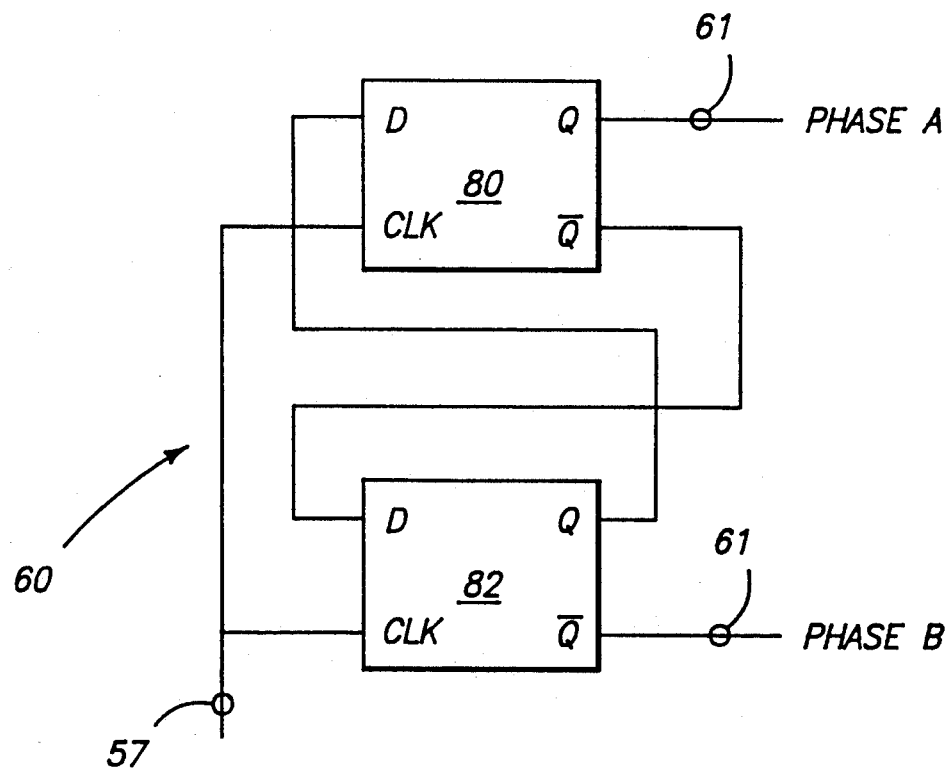
FIG. 4 is a schematic of a logic circuit employed in the control system shown in FIG. 2.

FIG. 4 illustrates an embodiment of the logic circuit 60. The logic circuit 60 comprises two cross-coupled flip-flops 80 and 82. The speed command signal is input over conductor 57 to the clock input (CLK) of the flip-flops 80 and 82. The D input of the flip-flop 80 is coupled to an output of the flip-flop 82. Likewise, the D input of the flip-flop 82 is coupled to an output of the flip-flop 80. The remaining outputs of the flip-flops 80 and 82 are coupled to drive the stepper motor 50. The flip-flop 80 outputs a drive signal over conductor 61 to control one phase (Phase A) of the stepper motor 50. The flip-flop 82 outputs a drive signal over conductor 61 to control another phase (Phase B) of the stepper motor 50. Because the stepper motor 50 is a two-phase D.C. stepper motor, only two drive signals are necessary to control the stepper motor 50. For other multiple phase stepper motors, additional drive signals would be required.

Although D flip-flops are illustrated in FIG. 4 as the preferred embodiment, the present invention contemplates the use of other types of flip-flops or circuitry. For example, additional logic may be provided in the logic circuit 60 to increase functionality, such as controlling the rotational direction of the stepper motor. Additionally, the conductors 55, 57, 59, 61, 71, 73 and 76 can be serial for transferring one bit of data after another, or parallel for transferring multiple bits of data simultaneously. Preferably, conductors 55, 71, and 73 are parallel conductors.

The electrophotographic printer of the present invention has numerous advantages over prior art electrophotographic printers. First, the stepper motor employed to drive the print media through the electrophotographic printer can be controlled without continuous interaction from a microprocessor. As a result, the microprocessor has more time to perform other processing tasks. Further, as printers continue to develop and perform more and more printing functions, the microprocessor will be called upon to perform more processing tasks. Due to the motor speed drive circuit of the present invention, the microprocessor will have more processing time to handle new tasks, and thus, processing time may not be the limiting factor in the future development of electrophotographic printers.

A second significant advantage of an electrophotographic printer according to the present invention is the predictable behavior of the stepper motor in the event of a microprocessor failure. In prior art printers, the stepper motor suffers unpredictable behavior if regular microprocessor interaction necessary for normal operation is lost for any reason. Because constant microprocessor interaction is not required in the present invention, the stepper motor will perform in a predictable manner in the event of a microprocessor failure.

Third, the electrophotographic printer of the present invention significantly reduces the processing burden, thereby making it possible to employ only a single microprocessor in the printer engine. This design would eliminate the electronics and I/O communications between a two microprocessor system, thereby making the printer electronically more simple and potentially less expensive.

In compliance with the statute, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An electrophotographic printer comprising:
   an image transfer assembly at an image transfer station for transferring an electrophotographic image onto a print media;
   a roller-fuser assembly at an image fixing station downstream of the image transfer station for affixing the electrophotographic image to the print media;
   a two phase D.C. stepper motor operatively connected to drive the roller-fuser assembly;
   a motor speed drive circuit for generating a selected rate of pulses to the stepper motor to drive the stepper motor at a desired rotational speed;
   a clock operatively coupled to the motor speed drive circuit for outputting a constant number of clock pulses for sequential predetermined time periods to synchronize the selected rate of pulses; and
   a microprocessor operatively coupled to, but separate from, the motor speed drive circuit for outputting a speed change value to change the selected rate of pulses generated by the motor speed drive circuit to change the desired rotational speed of the stepper motor;
   the motor speed drive circuit comprising:
      a programmable divider coupled to receive the speed change value and the clock pulses, the programmable divider storing the speed change value and dividing the number of clock pulses output per time period by the speed change value, the programmable divider outputting a speed command signal based on a result of the division; and
      a logic circuit coupled to receive the speed command signal, the logic circuit outputting multiple drive signals to the stepper motor in response to the speed command signal to drive the stepper motor at the desired speed, the logic circuit comprising two cross-coupled flip-flops which are clocked by the speed command signal, one flip-flop having an output coupled to one phase of the stepper motor and the other flip-flop having an output coupled to the other phase of the stepper motor.

2. An electrophotographic printer according to claim 1 wherein the image transfer assembly includes a drum, the stepper motor being operatively connected to rotate the drum at approximately the same speed as the roller-fuser assembly.

3. An electrophotographic printer comprising:
   an image transfer assembly at an image transfer station for transferring an electrophotographic image onto a print media;
   a roller-fuser assembly at an image fixing station downstream of the image transfer station for affixing the electrophotographic image to the print media;
   a two phase D.C. stepper motor operatively connected to drive the roller-fuser assembly;
   a motor speed drive circuit for generating a selected rate of pulses to the stepper motor to drive the stepper motor at a desired rotational speed;
   a clock operatively coupled to the motor speed drive circuit for outputting a constant number of clock pulses for sequential predetermined time periods to synchronize the selected rate of pulses; and
   a microprocessor operatively coupled to, but separate from, the motor speed drive circuit for outputting a speed change value to change the selected rate of pulses generated by the motor speed drive circuit to change the desired rotational speed of the stepper motor;
   the motor speed drive circuit comprising:
      a programmable divider coupled to receive the speed change value and the clock pulses, the programmable divider storing the speed change value and incrementally counting from the speed change value to a preset value in synchronization with the clock pulses, the programmable divider outputting a speed command signal upon reaching the preset value; and
      a logic circuit coupled to receive the speed command signal, the logic circuit outputting multiple drive signals to the stepper motor in response to the speed command signal to drive the stepper motor at the desired rotational speed, the logic circuit comprising two cross-coupled flip-flops which are clocked by the speed command signal, one flip-flop having an output coupled to one phase of the stepper motor and the other flip-flop having an output coupled to the other phase of the stepper motor.

4. An electrophotographic printer according to claim 3 wherein the image transfer assembly includes a drum, the stepper motor being operatively connected to rotate the drum at approximately the same speed as the roller-fuser assembly.

5. An electrophotographic printer comprising:
   an image transfer assembly at an image transfer station for transferring an electrophotographic image onto a print media;
   a roller-fuser assembly at an image fixing station downstream of the image transfer station for affixing the electrophotographic image to the print media;
   a stepper motor operatively connected to drive the roller-fuser assembly;
   a motor speed drive circuit for generating a selected rate of pulses to the stepper motor to drive the stepper motor at a desired rotational speed;
   a clock for outputting clock pulses to the motor speed drive circuit;
   a microprocessor operatively coupled to, but separate from, the motor speed drive circuit for outputting a speed change value to change the selected rate of pulses generated by the motor speed drive circuit to change the desired rotational speed of the stepper motor;

the motor speed drive circuit comprising:
  a register coupled to receive the speed change value from the microprocessor, the register storing the speed change value and outputting the speed change value upon receipt of a speed command signal;
  a counter coupled to receive the speed change value from the register and the clock pulses from the clock, the counter counting from the speed change value to a preset value in synchronization with the clock pulses, the counter outputting a count value indicative of each count;
  a determination circuit coupled to receive the count value from the counter, the determination circuit determining whether the count value is equal to the preset value and outputting the speed command signal to the register when the count value is equal to the preset value; and
  a logic circuit coupled to receive the speed command signal from the determination circuit, the logic circuit driving the stepper motor at the desired rotational speed in response to the speed command signal.

6. An electrophotographic printer according to claim 5 wherein the logic circuit comprises two cross-coupled flip-flops which are clocked by the speed command signal.

7. An electrophotographic printer comprising:
  an image transfer assembly at an image transfer station for transferring an electrophotographic image onto a print media;
  a roller-fuser assembly at an image fixing station downstream of the image transfer station for affixing the electrophotographic image to the print media;
  a multi-phase stepper motor operatively connected to drive the roller-fuser assembly;
  a motor speed drive circuit for generating a selected rate of pulses to the stepper motor to drive the stepper motor at a desired rotational speed, the motor speed drive circuit including two cross-coupled flip-flops, one flip-flop having an output coupled to a first phase of the stepper motor and the other flip-flop having an output coupled to a second phase of the stepper motor; and
  a microprocessor operatively coupled to, but separate from, the motor speed drive circuit for selectively changing the selected rate of pulses generated by the motor speed drive circuit to change the desired rotational speed of the stepper motor.

8. An electrophotographic printer comprising:
  an image transfer assembly at an image transfer station for transferring an electrophotographic image onto a print media;
  a roller-fuser assembly at an image fixing station downstream of the image transfer station for affixing the electrophotographic image to the print media;
  a multi-phase stepper motor operatively connected to drive the roller-fuser assembly;
  a motor speed drive circuit for generating a selected rate of pulses to the stepper motor to drive the stepper motor at a desired rotational speed; and
  a microprocessor operatively coupled to, but separate from, the motor speed drive circuit;
  the motor speed drive circuit maintaining the desired rotational speed without interaction from the microprocessor, the microprocessor occasionally interrupting the motor speed drive circuit to change the selected rate of pulses generated by the motor speed drive circuit to change the desired rotational speed of the stepper motor.

* * * * *